(12) United States Patent
Lin et al.

(10) Patent No.: US 10,310,657 B2
(45) Date of Patent: Jun. 4, 2019

(54) PLAYBACK METHOD, APPARATUS AND SYSTEM RELATED TO TOUCH INFORMATION TIMING

(71) Applicant: EGALAX_EMPIA TECHNOLOGY INC., Taipei (TW)

(72) Inventors: Po-Chuan Lin, Taipei (TW); Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 720 days.

(21) Appl. No.: 14/791,737

(22) Filed: Jul. 6, 2015

(65) Prior Publication Data
US 2015/0378668 A1 Dec. 31, 2015

Related U.S. Application Data

(63) Continuation of application No. 14/749,782, filed on Jun. 25, 2015, now Pat. No. 9,632,619.

(30) Foreign Application Priority Data

Jun. 25, 2014 (TW) .............................. 103121854 A
Jun. 25, 2014 (TW) .............................. 103121856 A

(51) Int. Cl.
| | | |
|---|---|---|
| G06F 3/041 | (2006.01) | |
| G06F 3/16 | (2006.01) | |
| G06F 3/0488 | (2013.01) | |
| G06F 3/0484 | (2013.01) | |

(52) U.S. Cl.
CPC ........ *G06F 3/0416* (2013.01); *G06F 3/04842* (2013.01); *G06F 3/04883* (2013.01); *G06F 3/165* (2013.01); *G06F 3/167* (2013.01); *G06F 2203/04106* (2013.01); *G06F 2203/04108* (2013.01)

(58) Field of Classification Search
CPC . G06F 2203/04106; G06F 2203/04108; G06F 3/0416; G06F 3/04842; G06F 3/04883; G06F 3/165; G06F 3/167
See application file for complete search history.

(56) References Cited

U.S. PATENT DOCUMENTS

| | | | |
|---|---|---|---|
| 9,269,399 B2 | 2/2016 | Wing et al. | |
| 2004/0140956 A1* | 7/2004 | Kushler | G06F 3/04883 345/168 |
| 2012/0012446 A1 | 1/2012 | Hwa | |
| 2014/0004950 A1 | 1/2014 | Szufnara et al. | |
| 2014/0013192 A1* | 1/2014 | McQuiggan | G09B 5/062 715/203 |

FOREIGN PATENT DOCUMENTS

| | | |
|---|---|---|
| CN | 102708862 | 10/2012 |
| CN | 102833490 | 12/2012 |
| CN | 103593131 | 2/2014 |
| CN | 103838723 A | 6/2014 |
| CN | 102932623 | 4/2017 |
| TW | 201222389 | 6/2012 |

* cited by examiner

*Primary Examiner* — Insa Sadio
(74) *Attorney, Agent, or Firm* — WPAT, PC

(57) ABSTRACT

The present invention provides a recording method of touch information timing. The method comprises receiving a first touch point information, determining whether the first touch point is the beginning point of a trace; and recording a first timing with respect to the receiving of the first touch point information if the first touch point is the beginning point of the trace.

32 Claims, 8 Drawing Sheets

PLAYBACK METHOD, APPARATUS AND SYSTEM RELATED TO TOUCH INFORMATION TIMING

CROSS REFERENCE TO RELATED APPLICATION

This present application is a continuation application of a pending U.S. patent application Ser. No. 14/749,782, filed on Jun. 25, 2015, which claims the benefit of Taiwan patent application No. 103121854, filed on Jun. 25, 2014 and Taiwan patent application No. 103121856, filed on Jun. 25, 2014.

BACKGROUND OF THE INVENTION

1. Field of the Invention

This invention generally relates to the field of recording and playing for the multimedia file, and more particularly, to record and play the multimedia file with touch trace relating to audio.

2. Description of the Prior Art

The electronic devices with touch technology are popularly used in daily life. For instance, people use an electronic device to record voice in a meeting or class, and also uses a pen or finger to write down notes on a touch panel or screen to save them as graphic files or video files. After that, people can see the graphic files or video files and listen to the recorded audio at the same time. However, there is no any relation record between the recorded audio and the graphic/video files, and people has to connect the recorded audio and the graphic/video files by his own memory.

Accordingly, a kind of mechanism that can automatically relate the recorded audio file to the graphic/video file is currently required. Especially, it can create the relation mechanism between the audio file and the touch trace of the graphic/video file, and this, makes people play the audio file or any one of the graphic/video file with the relation for each other.

SUMMARY OF THE INVENTION

In accordance with the present invention, a recording method, apparatus, system and computer-readable media of touch information timing substantially obviates one or more of the problems resulted from the limitations and disadvantages of the prior art mentioned in the background.

In one embodiment of the present invention, it provides a recording method for touch information timing. The recording method includes: receiving a first touch point information; determining whether the first touch point is a beginning point of a trace; and recording a first timing of receiving the first touch point information when the first touch point is the beginning point of the trace.

In another embodiment of the present invention, it provides a recording apparatus related to touch information timing. The recording apparatus includes a timing generating module and a processing module. The processing module receives touch information from a touch device to generate a first touch point information, determining whether the first touch point is a beginning point included in a trace, and records a first timing to a memory module as the timing generating module receiving the first touch point information when the first touch point is the beginning point of the trace.

In still another embodiment of the present invention, it provides a recording system related to touch information timing. The recording system includes a touch device, a memory module, and a processing device. The processing device includes a timing generating module, and a processing module. The processing module receives touch information from the touch device to generate a first touch point information, determining whether the first touch point is a beginning point included in a trace, and records a first timing to a memory module as the timing generating module receiving the first touch point information when the first touch point is the beginning point of the trace.

In one embodiment of the present invention, it provides a computer-readable media and the media includes the data as followings: at least one timing related to an audio information; and at least one visual object related to the at least one timing, wherein the at least one visual object is included in a visual information.

In one embodiment of the present invention, it provides a playback method related to touch information timing. The playback method includes: reading a data table which has at least one timing and a visual object related to the at least one timing; playing an audio information; displaying a visual information; and highlighting the visual object related to the at least one timing in the visual information when the audio information is played to a playing timing related to the at least one timing.

In another embodiment of the present invention, it provides a playback method related to touch information timing. The playback method includes: reading a data table which has at least one timing and at least one visual object related to the at least one timing; displaying a visual information including the at least one visual object; and starting to play an audio information from a playing timing related to the at least one timing when the at least one visual object is selected.

In still one embodiment of the present invention, it provides a playback apparatus related to touch information timing and the playing apparatus is used to perform the steps as followings: reading a data table from a memory module, the data table including at least one timing and a visual object related to the at least one timing; making an audio playing module play an audio information; and making a visual displaying module display a visual information, making the visual displaying module highlight the visual object related to the at least one timing in the visual information when the audio playing module plays the audio information to a playing timing related to the at least one timing.

In yet embodiment of the present invention, it provides a playback system related to touch information timing. The playback system includes: a memory module storing a data table, the data table including at least one timing and a visual object related to the at least one timing; an audio playing module; a visual displaying module; a processing device reading the data table from the memory module, making the audio playing module play an audio information and the visual displaying module display a visual information, and also making the visual displaying module display the visual object related to the at least one timing in the visual information when the audio playing module plays the audio information to a playing timing related to the at least one timing.

In one embodiment of the present invention, it provides a playback apparatus related to touch information timing. The playback apparatus is used to perform the following steps: reading a data table from a memory module, the data table including at least one timing and a visual object related to the at least one timing; making a visual displaying module display a visual information including the at least one visual object; and making an audio playing module start to play an audio information from a playing timing related to the at least one timing when the at least one visual object is selected.

In another embodiment of the present invention, it provides a playback system related to touch information timing. The system includes: a memory module storing a data table, the data table including at least one timing and a visual object related to the at least one timing; an audio playing module; a visual displaying module; and a processing device reading the data table from the memory module, making the visual displaying module display a visual information including the at least one visual object and making the audio playing module start to play an audio information from a playing timing related to the at least one timing when the at least one visual object is selected.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
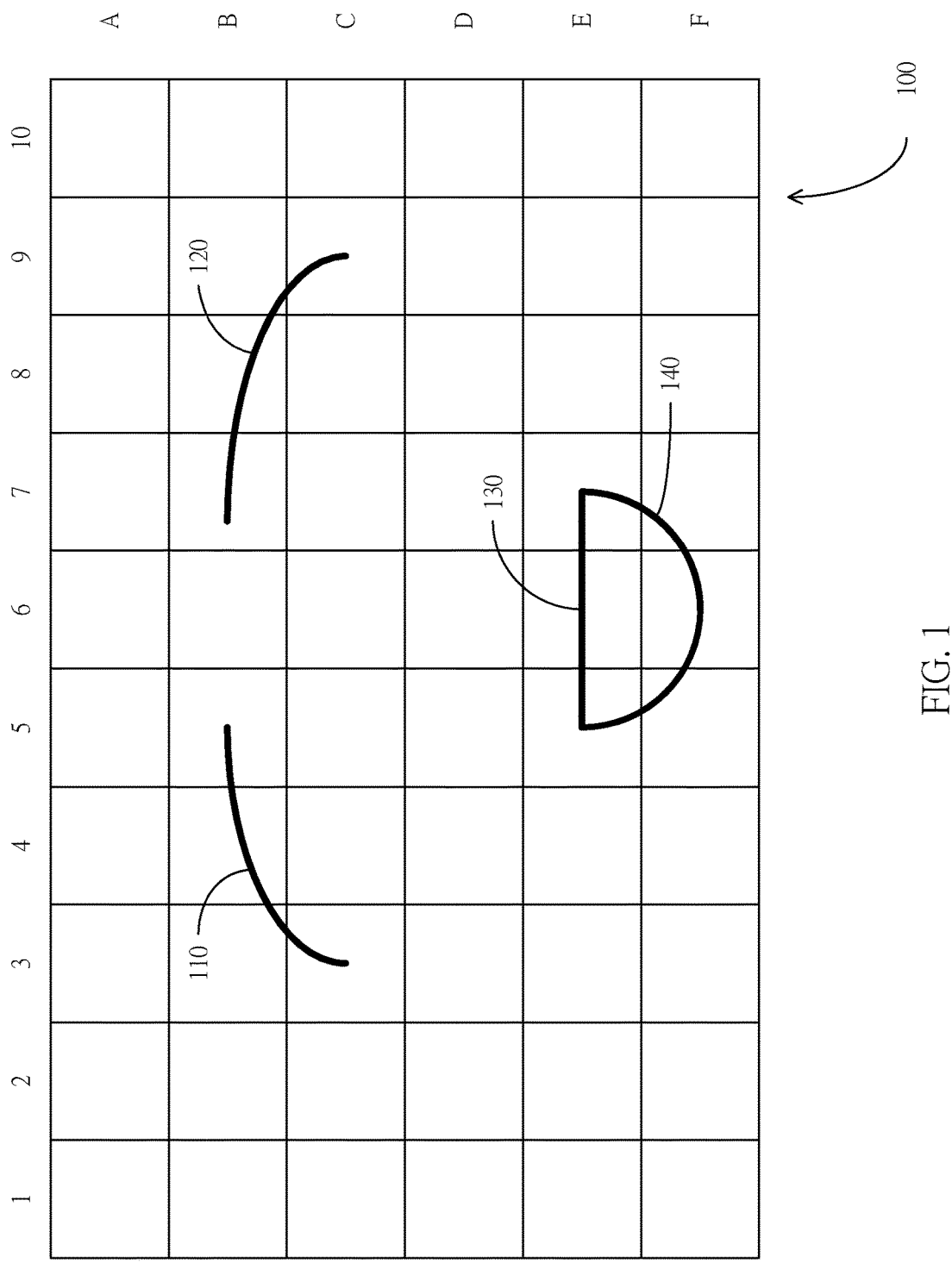
FIG. 1 illustrates touch traces for one preferred embodiment in accordance with the present invention.

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Recording voice in the present invention means, in one embodiment, an electronic device records surrounding voice by its own built-in hardware and software. The electronic device records voice and saves it as an audio file by the signal process steps such as sampling, encoding, and/or compressing. The present invention does not limit to the format, sampling rate, encoding, and/or compressing ratio of the audio file. In another embodiment, the electronic device can play audio in some formats and the audio through signal process can become an audio file. For example, the electronic device could real-time download the audio information from the network server, and also could receive the audio information from the input port. However, in some embodiment, the electronic device could receive audio information from several sources not only one. In other words, the electronic device could mix several audio information to comprise a new audio file.

The touch traces in the present invention could include the panel/screen traces touched or approached by pen, and also could include the panel/screen traces touched or approached by finger(s). In some embodiments, the touch panel/screen could identify each pen in several pens. The present invention does not limit to touch technologies, whatever, such as resistive, capacitive, projective capacitive, surface acoustic wave, optical projective, and etc. The touch technologies which can generate touch traces are all applied to the present invention.

As those mentioned above, the present invention intends to solve the problem is that recording touch traces and voice at the same time to make the two media be able to relate to each other at time. In one embodiment of the present invention, it could use an integrated recording application program to run the abovementioned recording voice and recording touch traces and the time relation between two of them. In one embodiment, the voice can be recorded in a file with other data. In another embodiment, the voice and other data can be recorded in several different files having relations to each other. The files can be played individually and independently. And also, the files could be integrated to play several ones with relations to each other.

In one embodiment of the present invention, it could use a voice-recording program and a touch-trace-recording application program to record voice and other data in several different files having relations to each other. The files can be played individually and independently. And also, the files could be integrated to play several ones with relations to each other.

Referring to FIG. 1, touch traces for one preferred embodiment in accordance with the present invention are illustrated. The touch area of a touch panel 100, in FIG. 1, is divided into several regions. In the embodiment of FIG. 1, the abovementioned regions are all squares and the area of each square is the same to each other. These squares are separated to 6 lines and each line has 10 squares. In other embodiments, the regions can be other shapes, such as rectangle or hexagon, and the area of each region could be different. In one embodiment, a region touched frequently can be divided into more sub-regions, and the area of each sub-region is smaller. The present invention does not limit to the number, shape, and area of these regions.

In the embodiment of FIG. 1, it includes 4 touch traces 110-140 with time sequence to form a smile sign. When a touch point is detected, the electronic device determines whether the touch point locates in a new region. In other words, the electronic device determines whether the touch point locates in different region to the preceding touch point. For example, when the first point of touch trace 110 entering region C3 is detected, the electronic device records a timing related to region C3.

The timing could be the time in the electronic device, and also could be the time related to a timing in the audio file. For example, it could be the timing related to the beginning of audio file, and also could be a period related to the preceding recorded timing. The time resolution for each electronic device using in recording could be different, some accurate to one-hundredth of a second and some accurate to one-millionth of a second. The timing for each recording allows inaccuracy or intended adjustment to align the data structure, such as frame structure. The present invention does not limit the form and resolution to timing, all need to do is to relate touch traces to the audio file.

When the touch trace 110 leaves region C3 to enter region B3, and the first touch point of the touch trace 110 in region B3 is detected, the electronic device records a timing related to region B3 since the first touch point in region B3 is different to the preceding touch point in region C3. Similarly, When the touch trace 110 leaves region B3 to enter region B4, and the first touch point of the touch trace 110 in region B4 is detected, the electronic device records a timing related to region B4 because the first touch point in region B4 is different to the preceding touch point in region B3, and so on.

Referring to Table 1, a relation data table for one preferred embodiment of the present invention is shown. The embodiment in Table 1 does not consider touch trace(s) but the relation between touch point(s) and region(s). In the embodiment of FIG. 1, the touch area of the touch panel 100 has 60 regions, and hence the relation data table has 60 regions in maximum and the timings related to these regions. In Table 1, the regions without being touched are ignored and are not recorded for saving the memory space. Of course, if the memory space does not take into consideration, all regions can be recorded to faster the speed of recording and restoring data.

TABLE 1

| region | relating timing (corresponding) |
|---|---|
| B3 | 00h:00m:01s:21 |
| B4 | 00h:00m:01s:31 |
| B5 | 00h:00m:01s:41 |
| B7 | 00h:00m:02s:11 |
| B8 | 00h:00m:02s:21 |
| B9 | 00h:00m:02s:31 |
| C3 | 00h:00m:01s:11 |
| C9 | 00h:00m:02s:41 |
| E5 | 00h:00m:03s:11 |
|    | 00h:00m:04s:11 |
| E6 | 00h:00m:03s:21 |
| E7 | 00h:00m:03s:31 |
|    | 00h:00m:04s:51 |
| F5 | 00h:00m:04s:21 |
| F6 | 00h:00m:04s:31 |
| F7 | 00h:00m:04s:41 |

It's worth noting that the regions E5 and E7 individually relate to two timings. The first timing is recorded for touch trace 130's entering and the second timing is recorded for touch trace 140's entering.

In one embodiment, Table 1 can be stored in the integrated multi-media file mentioned above, or in an independent relation file. When the visual information is played, Table 1 can be restored from the abovementioned integrated multi-media file or the independent relation file. When user's cursor/finger/pen points to or floats on some regions, the electronic device can find the relation timings from Table 1 to play the audio related to the timings. The steps for playing audio could be automatic or wait for user's command.

In the present invention, the visual information includes the data being able to be displayed and be seen by user's eyes. The visual information could be the motion film, static film and/or integrated both of them. In the present invention, the visual information includes the meanings mentioned above.

When the region has several timings, the electronic device plays the audio related to the earliest timing automatically or let user select which timing's audio to be played. For example, when user's cursor/finger/pen points to or floats on region E5, two timings 00 h: 00 m:03 s:11 and 00 h:00 m:04 s:11 can be offered to user to select by. Also, region E7 has two timings 00 h:00 m:03 s:31 and 00 h:00 m:04 s:51 can be offered to user to select by.

In the embodiment mentioned above, the audio information played starts from recorded timing. However, in another embodiment, the audio information played could also start from a period before or after the recorded timing. For instance, playing the audio information starts from 2 seconds before the recorded timing.

The present invention does not limit to the time for the audio information played on the recorded timing. In some embodiments, the structure of the audio information or other limits could make error. For example, after the signal processes, such as sampling, encoding, and compressing, the audio information could be recorded in one-tenth of a second as one unit or in irregular period as one unit. In this case, although the timing recorded could be accurate to one-hundredth of a second, the audio information played cannot be played at the recorded timing exactly. Those skill in the art can realize that between the recorded timing and the timing of the audio information played allows error or can be adjusted. However, the audio information played according to the recorded timing, even having error or being adjusted, should be included in the present invention.

In the data structure of Table 1, the timings can be looked up from regions, and regions can also be reversely looked up from the timings. However, the reversal looking up mentioned above needs at least one inquiry to each line of Table 1. In another embodiment, the data structure shown in Table 2 can be created for looking up regions via timings.

TABLE 2

| relating timing (corresponding) | region |
|---|---|
| 00h:00m:01s:11 | C3 |
| 00h:00m:01s:21 | B3 |
| 00h:00m:01s:31 | B4 |
| 00h:00m:01s:41 | B5 |
| 00h:00m:02s:11 | B7 |
| 00h:00m:02s:21 | B8 |
| 00h:00m:02s:31 | B9 |
| 00h:00m:02s:41 | C9 |
| 00h:00m:03s:11 | E5 |
| 00h:00m:03s:21 | E6 |
| 00h:00m:03s:31 | E7 |
| 00h:00m:04s:11 | E5 |
| 00h:00m:04s:21 | F5 |
| 00h:00m:04s:31 | F6 |
| 00h:00m:04s:41 | F7 |
| 00h:00m:04s:51 | E7 |

The recording position of Table 2 could be saved in the integrated multimedia file mentioned above, and could also be saved in an independent relation file, and even in the audio file. When the audio information is played, the Table 2 can be read from the abovementioned integrated multimedia file, independent relation file, or visual file. The relating region could be displayed on panel when audio is played between one timing and the next timing. For example, between 00 h:00 m:01 s:11 and 00 h:00 m:01 s:21, the region C3 can be highlighted; and between 00 h:00 m:01 s:21 and 00 h:00 m:01 s:31, the region B3 can be highlighted.

Those skilled in the art can realize the abovementioned highlighting can be achieved by many ways. For example, at least one method or the combination thereof as followings: displaying in different color or in glittering, line width-adding, region painting, and so on.

Figure 2:
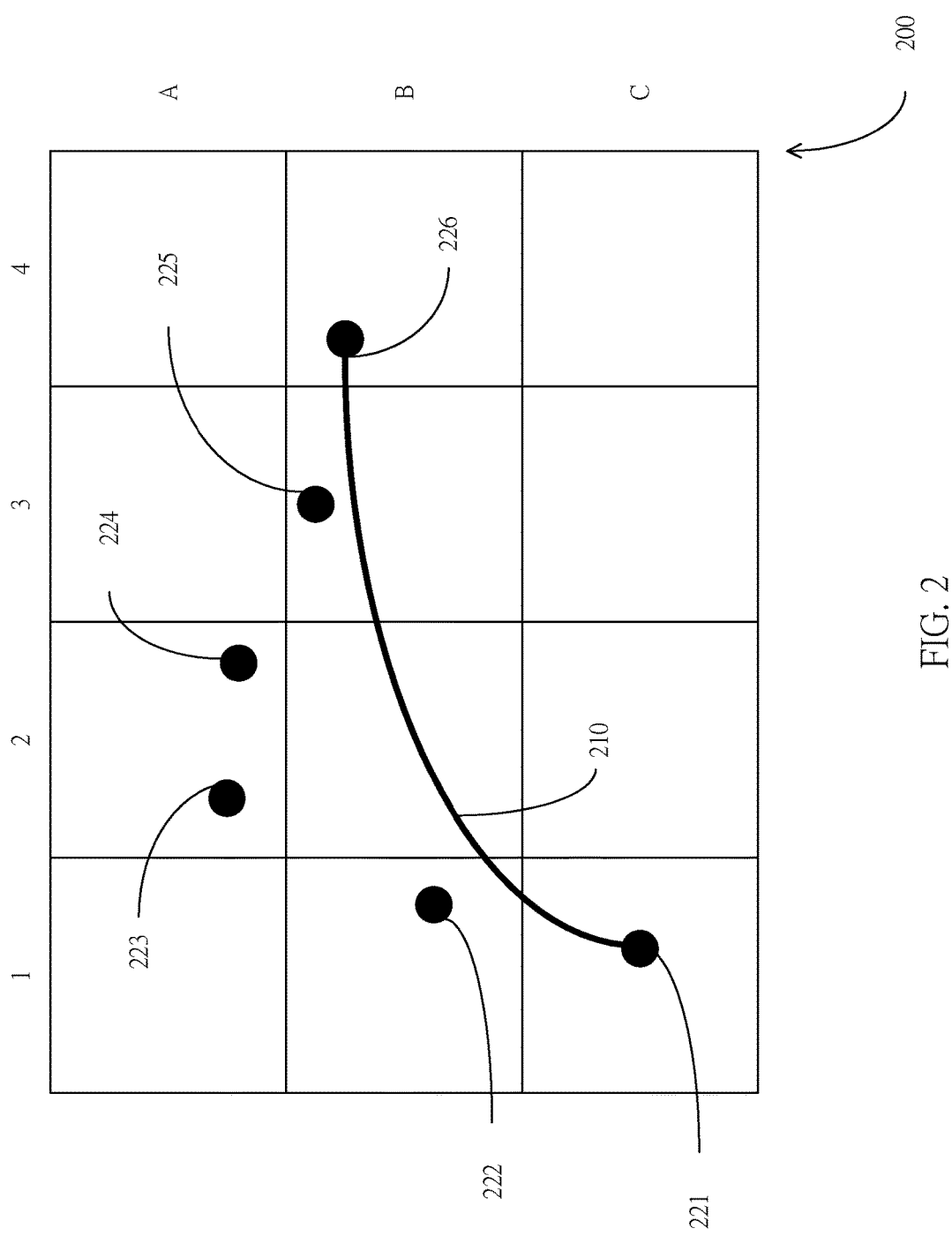
FIG. 2 illustrates touch traces and recorded traces for one preferred embodiment in accordance with the present invention.

In the abovementioned embodiments, the touch traces are the traces on the visual files, and hence the regions in Tables 1 and 2 relate to touch points. In some cases, the touch traces and the traces on the visual files are different. Referring to FIG. 2, the touch traces and recorded traces for one preferred embodiment in accordance with the present invention is illustrated.

In the embodiment of FIG. 2, it includes 6 touch points 221 to 226 on touch panel/screen 200 and an arc 210. The arc 210's beginning point is the first touch point 221 and its ending point is the last touch point 226. When user draws the arc 210, pen or finger will pass through the 6 touch points mentioned above but the visual information only records the arc 210 and does not record the 6 touch points. Further, the abovementioned 6 touch points relate to 5 regions, that is, C1, B1, A2, B3, and B4. And, the arc relates to 5 regions C1, B1, B2, B3, and B4. It is clearly that the touch points 223 and 224 are in region A2 but the arc 210 does not pass through region A2. On the contrary, the arc 210 pass through region B2 but there is no any touch point in region B2.

Those skills in the art can realize that there are many ways for the visual information to record the arc 210. In some embodiments, they record each point included in the arc 210. In other embodiments, they record the beginning and the ending positions of the arc 210, and the radian and the middle position of the arc 210. In the embodiment of FIG. 2, only the arc 210 is taken as the example but those skills in the art can realize that there are many cases showing the touch traces being different to recorded traces. For example, circle, rectangle, square, polygon, and so forth, the touch traces thereof are different to recorded traces thereof. Furthermore, after combining several touch traces, the electronic device can recognize them as characters to save as recorded characters.

In one embodiment, all regions passed by the arc 210 could all relate to the timing of the beginning point 221. Referring to Table 3, the embodiment of the arc 210 is recorded according to the form of Table 1. It can be find that the relating timings of these regions are the same. In this way, whatever which region is selected, the audio information of the timing related to touch point 221 is played.

TABLE 3

| region | relating timing (corresponding) |
| --- | --- |
| B1 | 00h:00m:01s:11 |
| B2 | 00h:00m:01s:11 |
| B3 | 00h:00m:01s:11 |
| B4 | 00h:00m:01s:11 |
| C1 | 00h:00m:01s:11 |

Similarly, Table 3 can be transferred into Table 4 using timings to relate to regions. In other words, when the audio information is played to the relating timing, the 5 regions in which the arc 210 locates will be highlighted.

TABLE 4

| relating timing (corresponding) | region |
| --- | --- |
| 00h:00m:01s:11 | B1 |
| 00h:00m:01s:11 | B2 |
| 00h:00m:01s:11 | B3 |
| 00h:00m:01s:11 | B4 |
| 00h:00m:01s:11 | C1 |

Figure 3:
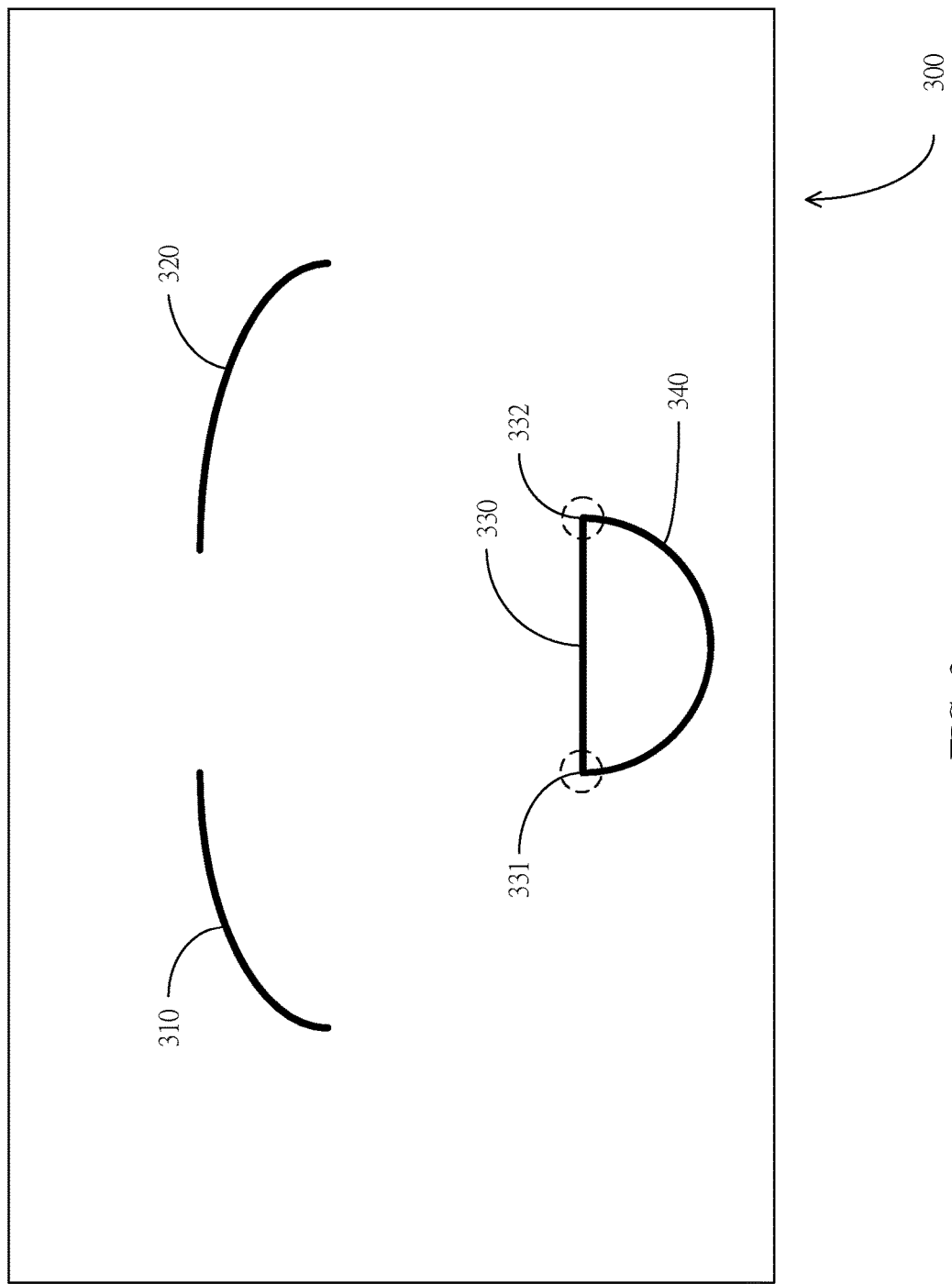
FIG. 3 illustrates traces for one preferred embodiment in accordance with the present invention.

Referring to FIG. 3, the traces for one preferred embodiment in accordance with the present invention are illustrated. Comparing to FIG. 1, the touch panel/screen 300 in FIG. 3 does not separate into several regions and user still draws 4 traces 310-340.

In one embodiment, these traces 310-340 could be touch traces or could also be the traces recorded by the visual information. The timing related to each trace is the timing of the first touch point for forming each trace detected by the electronic device. The present invention does not limit to how to record these traces 310-340. In one case, the trace can be presented by recording the coordinate position of each touch point. In another case, the trace can be presented by recording at least one coordinate position and at least one geometry parameter, such as recording the center coordinate of circle and the radius thereof. It is noticeable, the first touch point of the circle trace is not always the circle center, and that is, the coordinate of the touch point is not necessarily recorded.

Referring to Table 5, it shows a reference for the traces and the relating timings. It can be put in order by the sequence of the traces or by at least one coordinating of the traces.

TABLE 5

| relating timing (corresponding) | trace |
| --- | --- |
| 00h:00m:01s:11 | 310 |
| 00h:00m:02s:11 | 320 |
| 00h:00m:03s:11 | 330 |
| 00h:00m:04s:11 | 340 |

When the audio information is played, after one relating timing and before the next relating timing, the relating trace can be highlighted. For example, after the timing 00 h:00 m:01 s:11 and before the timing 00 h:00 m:02 s:11, the trace 310 can be highlighted. In a variation of Table 5, each trace can still relate to the timing of ending. In another variation of Table 5, several traces can be combined into a trace sign to use a field to present the beginning and/or ending timings related to several traces.

On the contrary, when user selects one trace of the visual information, such as trace 320, the electronic device plays the audio information form the relating timing 00 h:00 m:02 s:11. It's worth noting and those skilled in the art can realize that there are many ways to achieve selecting one trace. For example, touching on the trace, touching on some area of the trace shape, touching on the area surrounded by the trace, touching on some shape area extended by the trace can select the trace.

In the embodiment of FIG. 3, the traces 330 and 340 are mixed on points 331 and 332. In one embodiment, when the point 331 or 332 is touched, user could select to play the audio information of the two timing related to traces 330 and 340. In another embodiment, when the point 331 or 332 is selected, user could not select to play the audio information but could be enforcing to select the un-mixed part of the trace 330 or 340.

Figure 4:
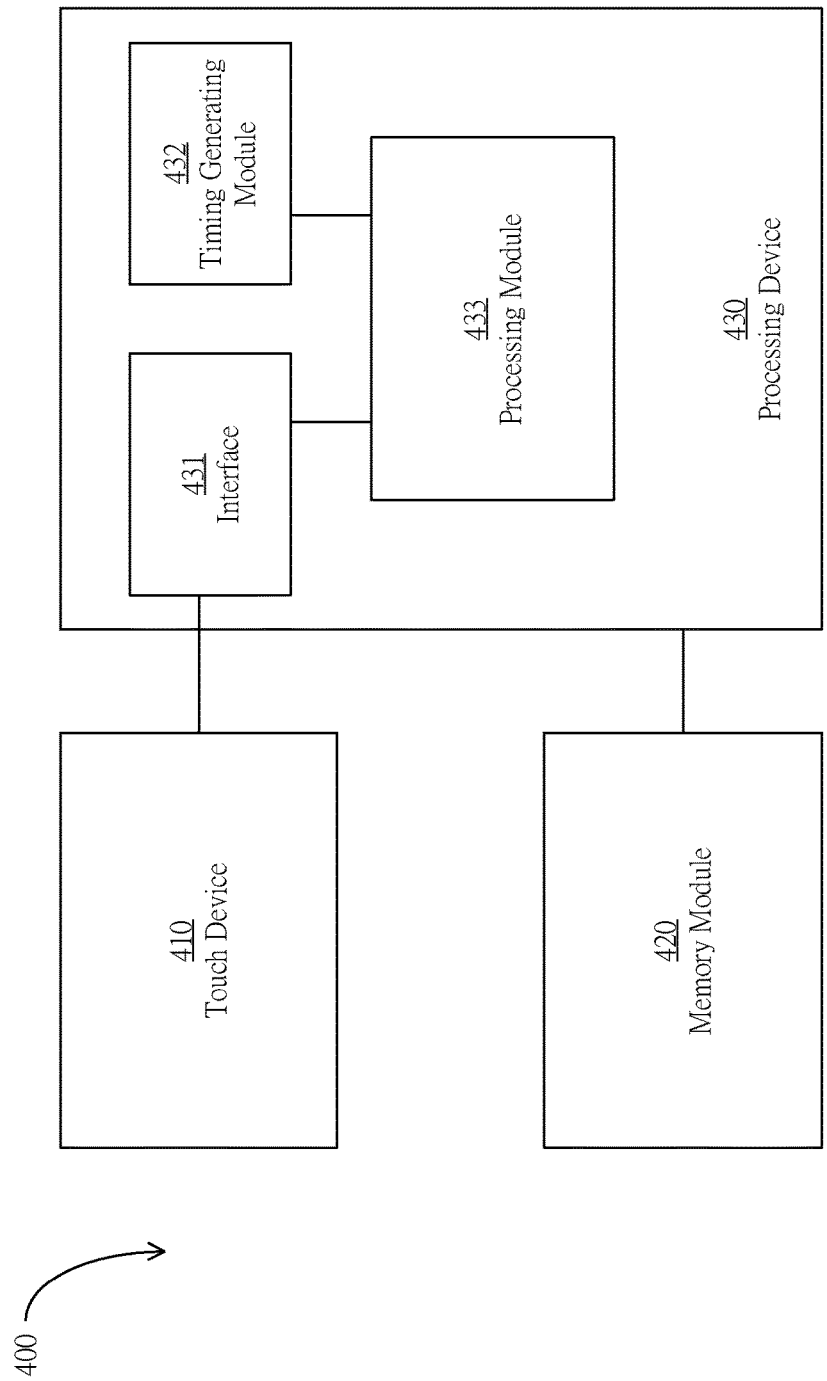
FIG. 4 illustrates a block diagram of a recording system for one preferred embodiment related to touch information timing in accordance with the present invention.

Referring to FIG. 4, a block diagram of a recording system 400 for one preferred embodiment related to touch information timing in accordance with the present invention is illustrated. The recording system 400 has a touch device 410, a memory module 420, and a processing device 430. The touch device 410 could be a touch panel or a touch screen. The processing device 430 further includes an interface 431 to connect with the touch device 410, a timing generating module 432 to generate timing(s), and a processing module 433. In one embodiment, the processing device 430 could directly connect to the touch device 410 to receive the relating information of the touch point. The timing generating module 432 could receive clock signal or time signal to generate timing to the combination of software, hardware, or firmware of the processing module 433. The processing module 433 could be a calculating unit for performing the operating system, driving programs, and/or application programs of the recording system.

Figure 5:
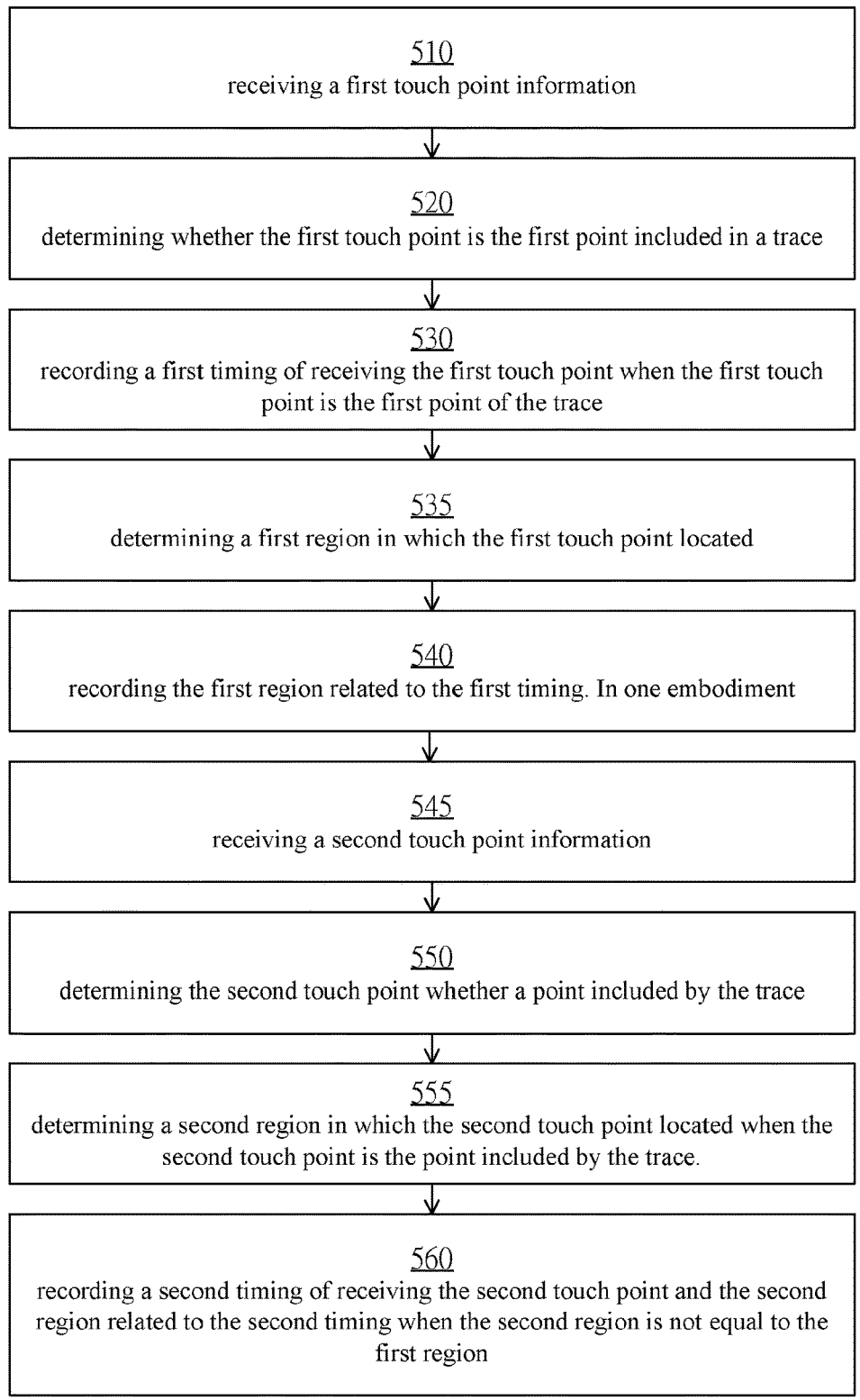
FIG. 5 illustrates a flowchart of a recording method for one preferred embodiment related to touch information timing in accordance with the present invention.

Referring to FIG. 5, a flowchart of a recording method for one preferred embodiment related to touch information timing in accordance with the present invention is illustrated. The recording method could be performed by the processing module 433 shown in FIG. 4. It is noticeable that the present invention does not limit to the steps being performed in sequence except there are obvious causations between the steps. Also, the present invention does not limit to the extra steps being not inserted to the steps. The followings are the descriptions for each step.

Step 510: receiving a first touch point information. The processing module 433 could get or receive a touch point information via the interface 431 or directly from the touch device 410.

Step 520: determining whether the first touch point is the first point included in a trace. The definition of the trace could refer to the descriptions of FIGS. 1-3.

Step 530: recording a first timing of receiving the first touch point when the first touch point is the first point of the trace. The following steps 535-560 are optional steps.

Step 535: determining a first region in which the first touch point located. The definition for the first region could refer to the relating descriptions of FIGS. 1-2.

Step 540: recording the first region related to the first timing. In one embodiment, the data structure like Tables 1-4 can be acquired and be stored in the memory module 420.

Step 545: receiving a second touch point information. The second touch point is not limited to the touch point next to the first touch point, and it could be anyone of touch points among the second to the Nth next to the first touch point.

Step 550: determining the second touch point whether a point included by the trace.

Step 555: determining a second region in which the second touch point located when the second touch point is the point included by the trace. It's worth noticing that when the second touch point is not the point included by the trace, the second touch point could be the first point of another trace. In this case, it is suitable to start from step 510.

Step 560: recording a second timing of receiving the second touch point and the second region related to the second timing when the second region is not equal to the first region. In one embodiment, the data structure like Tables 1-4 can be acquired and be stored in the memory module 420.

Figure 6:
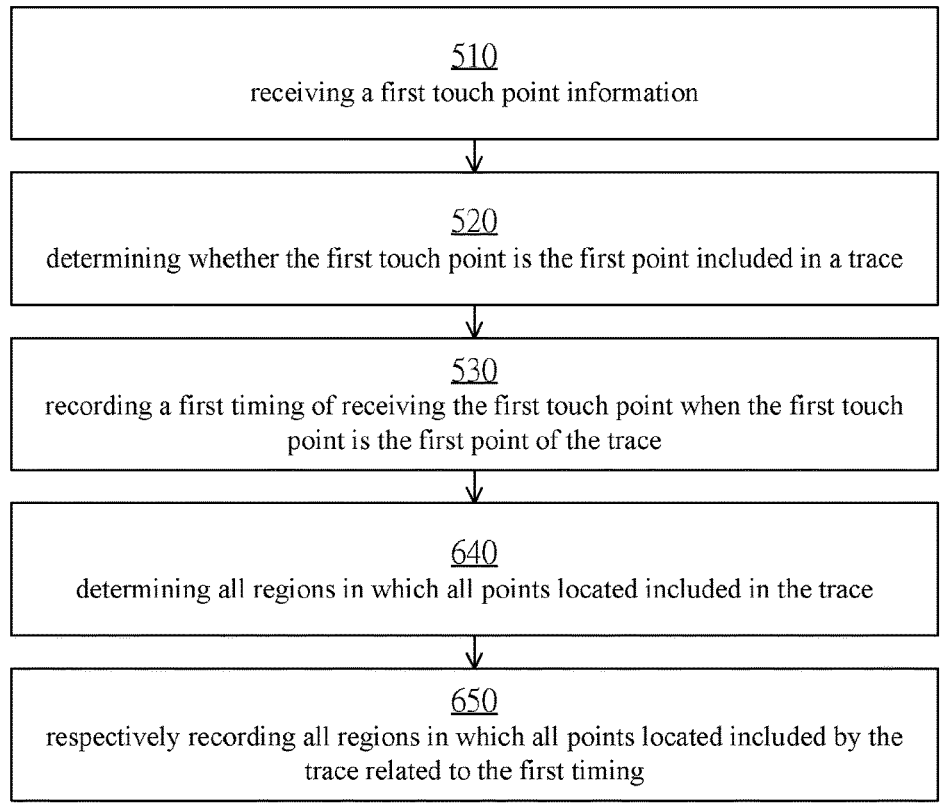
FIG. 6 illustrates a flowchart of a recording method for one preferred embodiment related to touch information timing in accordance with the present invention.

Referring to FIG. 6, a flowchart of a recording method for one preferred embodiment related to touch information timing in accordance with the present invention is illustrated. The recording method could be performed by the processing module 433 shown in FIG. 4. It is noticeable that the present invention does not limit to the steps being performed in sequence except there are apparent causations between the steps. Moreover, the present invention does not limit to the extra steps being not inserted to the steps. FIG. 6 is one variation embodiment of FIG. 5 and the first three steps are the same. The differences are those optional steps 640-650. The followings are the descriptions for steps 640-650.

Step 640: determining all regions in which all points located included in the trace. The definition of the trace could refer to the descriptions of FIGS. 1-3. In one embodiment, all points included by the trace are the touch points, such as the embodiment of FIG. 1. In another embodiment, the trace at least includes a non-touch point, such as the embodiment of FIG. 2.

Step 650: respectively recording all regions in which all points located included by the trace related to the first timing. Each region relates to the same first timing and saves in the memory module 420.

Figure 7:
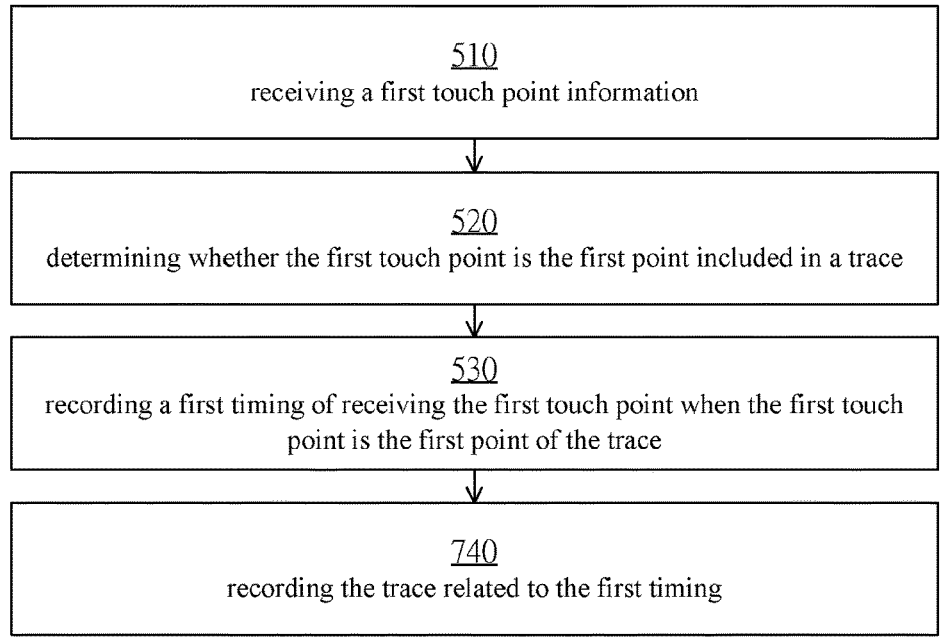
FIG. 7 illustrates a flowchart of a recording method for one preferred embodiment related to touch information timing in accordance with the present invention.

Referring to FIG. 7, a flowchart of a recording method for one preferred embodiment related to touch information timing in accordance with the present invention is illustrated. The recording method could be performed by the processing module 433 shown in FIG. 4. It's worth noticing that the present invention does not limit to the steps being performed in sequence except there are obvious causations between the steps. And, the present invention does not limit to the extra steps being not inserted to the steps. FIG. 7 is one variation embodiment of FIG. 5 and the first three steps are the same. The difference is the optional step 740. The following is the description for step 740.

Step 740: recording the trace related to the first timing. The trace could be the embodiment trace shown in FIG. 5. In one embodiment, all points included by the trace are touch points. In another embodiment, the trace at least includes a non-touch point. In some cases, the recording method could further include recording at least one coordinating point of the trace, and could also further includes recording at least one non-coordinating point parameter of the trace.

In the embodiments of FIGS. 5-7, these recording methods could all include recording an audio information, and wherein the first timing relates to one timing of the audio information. Moreover, they could further include recording a visual information having the trace.

Figure 8:
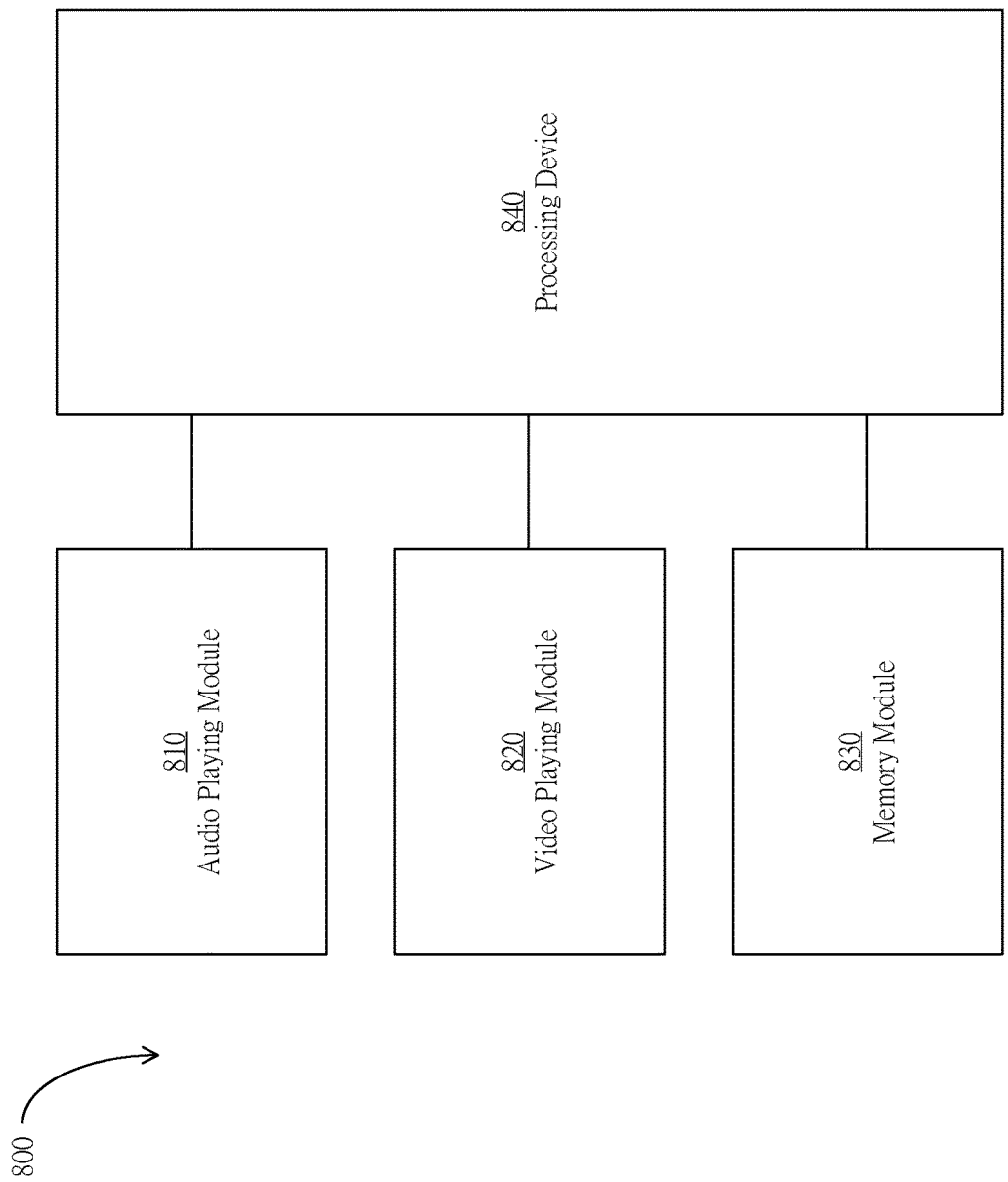
FIG. 8 illustrates a block diagram of a playing system for one preferred embodiment related to touch information timing in accordance with the present invention.

Referring to FIG. 8, a block diagram of a playback system 800 for one preferred embodiment related to touch information timing in accordance with the present invention is illustrated. The playback system 800 includes an audio playing module 810, a visual playing module 820, a memory module 830, and a processing device 840. The visual playing module 820 could be a touch screen or a normal displaying module without any touch technology. The processing device 840 could be a calculating unit for performing the operating system, driving programs, and/or application programs of the playback system 800, and controlling the abovementioned modules 810-830. In one embodiment, the processing device 840 could include the part of or all of the processing module 433 shown in FIG. 4. The processing device 840 could perform the playback methods as followings.

Figure 9:
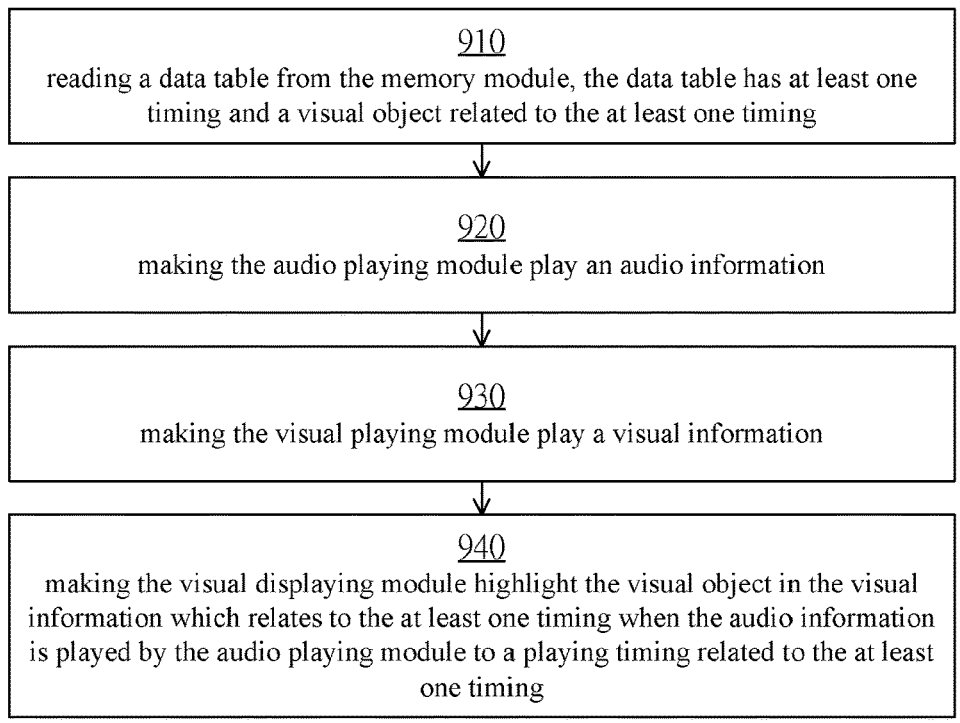
FIG. 9 illustrates a flowchart of a playing method for one preferred embodiment related to touch information timing in accordance with the present invention.

Referring to FIG. 9, a flowchart of a playback method for one preferred embodiment of touch information timing in accordance with the present invention is illustrated. The playback method could be performed by the processing device 840 shown in FIG. 8. It's worth noticeable that the present invention does not limit to the steps being performed in sequence except there are obvious causations between the steps. And, the present invention does not limit to the extra steps being not inserted to the steps.

Step 910: reading a data table from the memory module 830, the data table has at least one timing and a visual object related to the at least one timing. The data table could be one or the variation of Tables 1-5 mentioned above. In one embodiment, the visual object includes at least one displaying area, such as the displaying area meant by Tables 1-4. In another embodiment, the visual object includes at least one trace, such as the trace meant by FIGS. 1-3.

Step 920: making the audio playing module 810 play an audio information.

Step 930: making the visual playing module 820 play a visual information.

Step 940: making the visual displaying module 820 highlight the visual object in the visual information which relates to the at least one timing when the audio information is played by the audio playing module 810 to a playing timing related to the at least one timing.

In one embodiment, the at least one timing and the timing of playing are in a range of allowable time error. In another embodiment, the timing of playing is earlier than the at least one timing. In still another embodiment, the timing of playing relates to a sub-data of the audio information.

Figure 10:
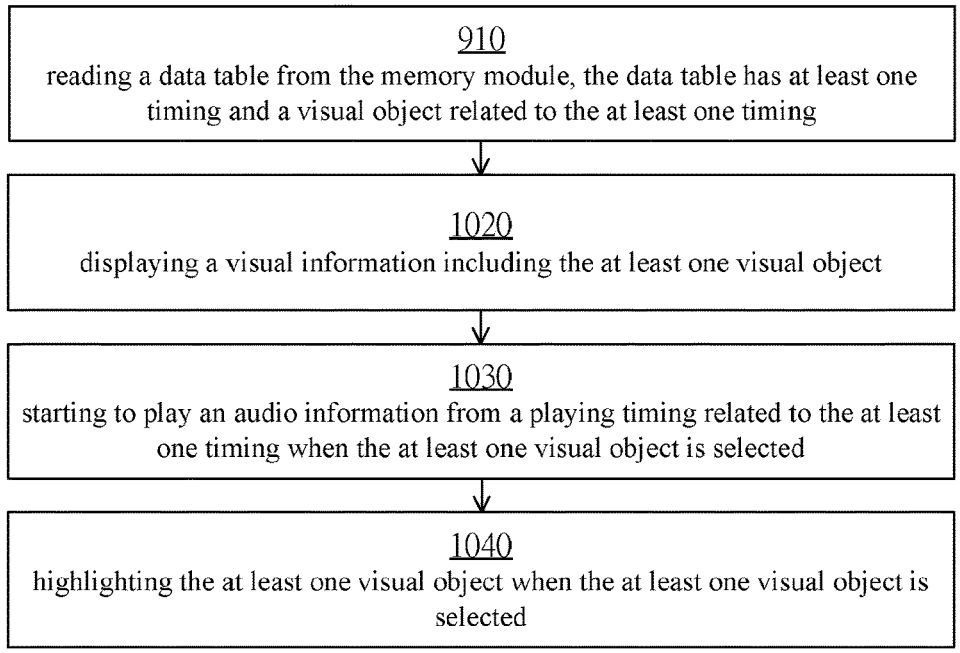
FIG. 10 illustrates a flowchart of a playing method for one preferred embodiment related to touch information timing in accordance with the present invention.

Referring to FIG. 10, a flowchart of a playback method for one preferred embodiment of touch information timing in accordance with the present invention is illustrated. The playback method could be performed by the processing device 840 of FIG. 8. It's worth noticing that the present invention does not limit to the steps being performed in sequence except there are clear causations between the steps. The present invention does not limit to the extra steps being not inserted to the steps. Step 910 of FIG. 10 can be adapted to the description of step 910 of FIG. 9, and thus this part will not be repeated.

Step 1020: displaying a visual information including the at least one visual object.

Step 1030: starting to play an audio information from a playing timing related to the at least one timing when the at least one visual object is selected.

Optional step 1040: highlighting the at least one visual object when the at least one visual object is selected.

In one embodiment, the at least one timing and the timing of playing are in a range of allowable time error. In another embodiment, the timing of playing is earlier than the at least one timing. In still another embodiment, the timing of playing relates to a sub-data of the audio information.

In one variation embodiment of FIG. 10, when the visual object relates to several timings, the several timings are displayed. When one of the timings is selected, the audio information starts to be played from a playing timing related to the selected timing. In another variation, the audio information starts to be played from a playing timing related to the earliest timing in those timings.

Although specific embodiments have been illustrated and described, it will be obvious to those skilled in the art that various modifications may be made without departing from what is intended to be limited solely by the appended claims.

What is claimed is:

1. A playback method related to touch information timing, said playback method comprising:
    reading a data table including at least one timing and a visual object related to said at least one timing, wherein said data table is stored in an integrated multi-media file or in an independent relation file;
    playing an audio information;
    displaying a visual information, wherein when the visual information is displayed, said data table is restored from said integrated multi-media file or said independent relation file; and
    highlighting said visual object related to said at least one timing in said visual information when said audio information is played to a playing timing related to said at least one timing.

2. The playback method according to claim 1, wherein said at least one timing and said playing timing are in a range of time error.

3. The playback method according to claim 1, wherein said playing timing is earlier than said at least one timing.

4. The playback method according to claim 1, wherein said playing timing relates to a sub-information of said audio information.

5. The playback method according to claim 1, wherein said visual object includes at least one displaying area.

6. The playback method according to claim 1, wherein said visual object includes at least one trace.

7. A playback method related to touch information timing, said playback method comprising:
    reading a data table including at least one timing and at least one visual object related to said at least one timing, wherein said data table is stored in an integrated multi-media file or in an independent relation file;
    displaying a visual information including said at least one visual object, wherein when the visual information is displayed, said data table is restored from said integrated multi-media file or said independent relation file; and
    starting to play an audio information from a playing timing related to said at least one timing when said at least one visual object is selected.

8. The playback method according to claim 7, further comprising:
    highlighting said at least one visual object when said at least one visual object is selected.

9. The playback method according to claim 7, wherein said at least one timing and said playing timing are in a range of time error.

10. The playback method according to claim 7, wherein said playing timing is earlier than said at least one timing.

11. The playback method according to claim 7, wherein said playing timing relates to a sub-information of said audio information.

12. The playback method according to claim 7, wherein said visual object includes at least one displaying area.

13. The playback method according to claim 7, wherein said visual object includes at least one trace.

14. The playback method according to claim 7, further comprising:
    displaying a plurality of timings when said visual object relating to said plurality of timings; and
    starting to play said audio information from a playing timing related to one of said plurality of timings when said one of said plurality of timings is selected.

15. The playback method according to claim 7, further comprising:

starting to play said audio information from a playing timing related to one earliest timing in a plurality of timings when said visual object relating to said plurality of timings.

16. A playback apparatus related to touch information timing, said playback apparatus used to perform the steps comprising:

reading a data table from a memory module, wherein said data table includes at least one timing and a visual object related to said at least one timing, wherein said data table is stored in an integrated multi-media file or in an independent relation file;

making an audio playing module play an audio information; and making a visual displaying module display a visual information, making said visual displaying module highlight said visual object related to said at least one timing in said visual information when said audio playing module playing said audio information to a playing timing related to said at least one timing, wherein when the visual information is displayed, said data table is restored from said integrated multi-media file or said independent relation file.

17. The playback apparatus according to claim 16, wherein said at least one timing and said playing timing are in a range of time error.

18. The playback apparatus according to claim 16, wherein said playing timing is earlier than said at least one timing.

19. The playback apparatus according to claim 16, wherein said playing timing relates to a sub-information of said audio information.

20. The playback apparatus according to claim 16, wherein said visual object includes at least one displaying area.

21. The playback apparatus according to claim 16, wherein said visual object includes at least one trace.

22. A playback system related to touch information timing, said playback system comprising:

a memory module storing a data table, wherein said data table includes at least one timing and a visual object related to said at least one timing, wherein said data table is stored in an integrated multi-media file or in an independent relation file;

an audio playing module;

a visual displaying module; and a processing device, reading said data table from said memory module, making said audio playing module play an audio information, making said visual displaying module display a visual information, making said visual displaying module highlight said visual object related to said at least one timing in said visual information when said audio playing module playing said audio information to a playing timing related to said at least one timing, wherein when the visual information is displayed, said data table is restored from said integrated multi-media file or said independent relation file.

23. A playback apparatus related to touch information timing, said playback apparatus used to perform the steps comprising:

reading a data table from a memory module, wherein said data table includes at least one timing and a visual object related to said at least one timing, wherein said data table is stored in an integrated multi-media file or in an independent relation file;

making a visual displaying module display a visual information including said at least one visual object, wherein when the visual information is displayed, said data table is restored from said integrated multi-media file or said independent relation file; and making an audio playing module start to play an audio information from a playing timing related to said at least one timing when said at least one visual object is selected.

24. The playback apparatus according to claim 23, further used to perform the step comprising:

making said visual displaying module highlight said at least one visual object when said at least one visual object is selected.

25. The playback apparatus according to claim 23, wherein said at least one timing and said playing timing are in a range of time error.

26. The playback apparatus according to claim 23, wherein said playing timing is earlier than said at least one timing.

27. The playback apparatus according to claim 23, wherein said playing timing relates to a sub-information of said audio information.

28. The playback apparatus according to claim 23, wherein said visual object includes at least one displaying area.

29. The playback apparatus according to claim 23, wherein said visual object includes at least one trace.

30. The playback apparatus according to claim 23, further used to perform the steps comprising:

making said visual displaying module display a plurality of timings when said visual object relating to said plurality of timings; and making said audio playing module start to play said audio information from a playing timing related to one of said plurality of timings when said one of said plurality of timings is selected.

31. The playback apparatus according to claim 23, further used to perform the step comprising:

making said audio playing module start to play said audio information from a playing timing related to one earliest timing in a plurality of timings when said visual object relating to said plurality of timings.

32. A playback system related to touch information timing, said playback system comprising:

a memory module storing a data table, wherein said data table includes at least one timing and a visual object related to said at least one timing, wherein said data table is stored in an integrated multi-media file or in an independent relation file;

an audio playing module;

a visual displaying module; and a processing device, reading said data table from said memory module, making said visual displaying module display a visual information including said at least one visual object, making an audio playing module start to play an audio information from a playing timing related to said at least one timing when said at least one visual object is selected, wherein when the visual information is displayed, said data table is restored from said integrated multi-media file or said independent relation file.

* * * * *